May 4, 1954 O. K. KOLB ET AL 2,677,728

PROCESS OF AND APPARATUS FOR DEVELOPING VISIBLE SOUND RECORDS SYNCHRONIZED WITH INVISIBLE RECORDINGS ON MAGNETIC TAPES

Filed Sept. 15, 1947 2 Sheets-Sheet 1

INVENTORS
OTTO KURT KOLB,
AXEL CARL GEORG PETERSEN,

BY Pierce, Scheffler + Parker,
ATTORNEYS

PROCESS OF AND APPARATUS FOR DEVELOPING VISIBLE SOUND RECORDS SYNCHRONIZED WITH INVISIBLE RECORDINGS ON MAGNETIC TAPES

Filed Sept. 15, 1947 2 Sheets-Sheet 2

INVENTORS
OTTO KURT KOLB,
AXEL CARL GEORG PETERSEN,
BY Pierce, Scheffler & Parker,
ATTORNEYS Patented May 4, 1954 2,677,728

UNITED STATES PATENT OFFICE 2,677,728

PROCESS OF AND APPARATUS FOR DEVELOPING VISIBLE SOUND RECORDS SYNCHRONIZED WITH INVISIBLE RECORDINGS ON MAGNETIC TAPES

Otto Kurt Kolb and Axel Carl Georg Petersen, London, England, assignors to British Acoustic Films Limited, London, England, a British company Application September 15, 1947, Serial No. 774,078

Claims priority, application Great Britain October 23, 1946

6 Claims. (Cl. 179—100.2)

This invention relates to an improved method of making a sound record and has for its principal object to provide an arrangement which will enable apparatus for recording sound without a visible trace to be used either for film phonographs or for sound film purposes.

Carriers upon which a sound record or signal can be made without a visible indication are already known as, for example, a sound record of the type which is opaque to ultraviolet rays but is translucent to visible light. A further method of making a very high quality invisible sound record with a high degree of contrast and wide frequency range is that which is obtained by magnetic means employing a carrier made of paper or a synthetic plastic material such as cellulose acetate or polyvinyl-chloride which is impregnated or coated with a ferro-magnetic or similar compound.

It is already known to use this type of recording in film phonographs and it can also be used for sound film recording.

However, difficulties arise when editing invisible sound record carriers and even more when using them with a complementary picture record as in the latter case the sound record has to be cut very accurately, almost to within the length of a few centimeters, to synchronize it with the corresponding picture record.

These difficulties are overcome according to this invention by adding to the invisible sound signal record a visible record of the same, or part of the same, sound signal, the visible record being hereinafter referred to as a signal indication record.

The visible signal indication record may be recorded simultaneously with the invisible main sound record or it may be added to the main sound record at a later stage when, for instance, the latter is re-recorded. For example, the main invisible sound record may be recorded without a signal indication record and may then be played back and signals taken from the reproducing channel to actuate the device which adds the signal indication record.

The visible signal indication record may be added to the carrier bearing the invisible sound record or to a separate carrier, and it may be made by an inking device or by lacquering or spraying. Or, again, it may be made by means of a recording stylus or similar cutting device, or, in the case where the indication record is made on a separate carrier it may be produced by means of an electro-chemical process, which in its simplest form may comprise the use of a polarity indicating paper, such as employed in electro-chemical recording and known generally as "pole paper," containing phenol phthalein or other chemicals as indicators.

The visible indication record need not be a faithful duplication of the sound signal record but may be clipped to follow only a limited amplitude or frequency range of the sound signals being recorded, thus permitting use of non-linear and therefore relatively inexpensive amplifiers and recorders. In this respect the device making the indication record can even be actuated by a rectified current obtained in known manner, which follows the envelope, the average value or some other function of the sound waves being recorded. The device making the visible indication record can also be operated by any other suitable control current derived from the signals being recorded, or already recorded.

In some cases it may be preferable to employ a magnetic sound record carrier in which the carrier base is coated on each side with a layer, one of these layers being provided for a magnetic sound record and the other for a visible indication record corresponding to the magnetic sound record. The layer carrying the visible indication record may be made of gelatine or wax, which is particularly advantageous when the visible indication record is cut or engraved by a recording stylus or the like.

The invention will now be described with reference to the accompanying drawings, wherein.

Figure 1:
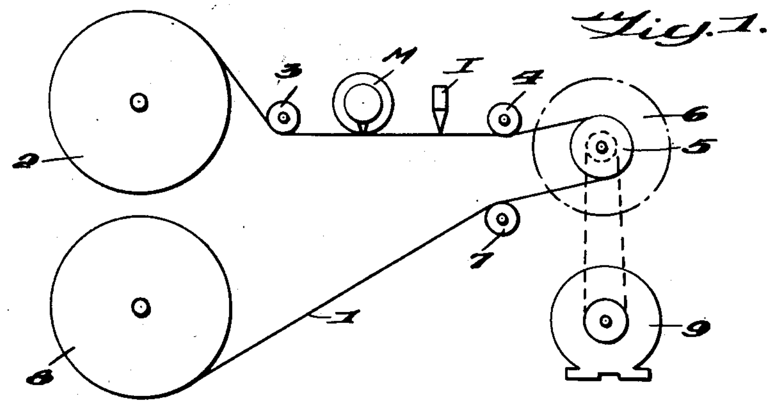
Fig. 1 illustrates schematically one arrangement for making a visible indication record according to the invention.

Referring to Fig. 1 of the accompanying drawings, this illustrates an embodiment of the invention, by way of example only, and shows a recording carrier 1, which may be a tape impregnated with a ferro-magnetic compound or coated with such a compound. This tape 1 is fed from an upper reel 2 round an idle roller 3, under a magnetic recording head M and a device I (to be described in greater detail hereinafter), which applies the visible indication record, then round a further idle roller 4 and drum 5 connected to a flywheel 6 (shown in dotted lines) and over a further idle roller 7 on to a take-up reel 8. The flywheel 6 and drum 5 are coaxial and driven by a motor illustrated at 9.

Although the magnetic recording head M and the visible indication recording device I are shown on the same side of the tape 1, it is, of course, possible for them to be disposed on opposite sides of the tape.

Figures 2, 11:
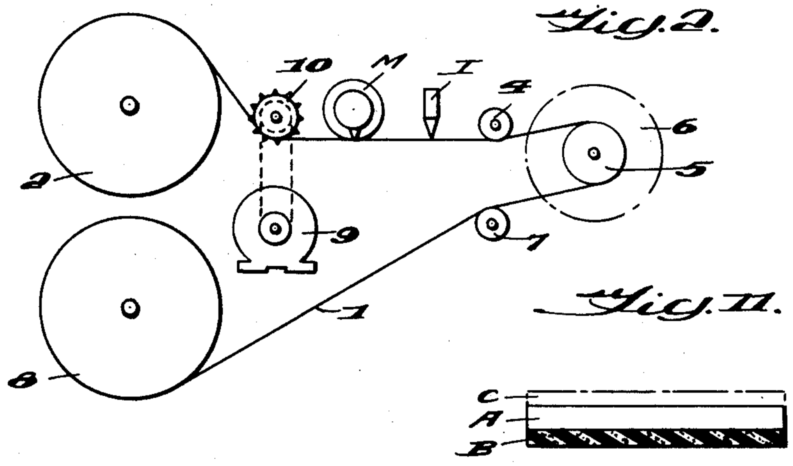
Fig. 2 illustrates schematically a modification of the arrangement shown in Fig. 1.
Fig. 11 illustrates an enlarged section through a piece of tape of the usual kind.
Figures 5, 6, 7, 8, 9, 10:
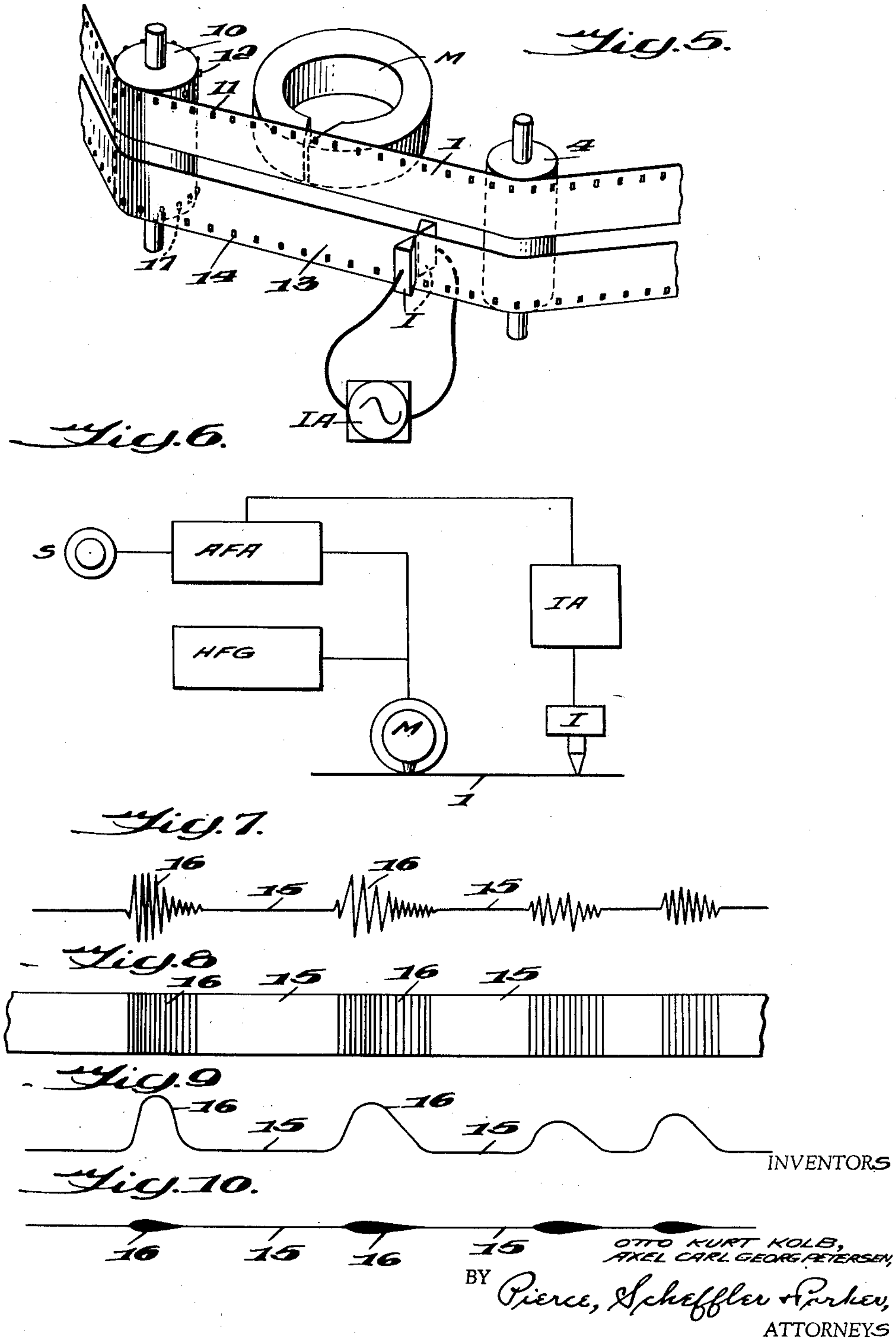
Fig. 5 is a perspective view illustrating a modified detail of the arrangement shown in Fig. 2.
Fig. 6 is a block schematic diagram of the sound signal and visible indication recording channels.
Figs. 7, 8, 9 and 10 illustrate the various types of visible signal indication records obtained according to the invention.

Fig. 2 illustrates a modification of the arrangement shown in Fig. 1 in which the motor 9 instead of driving the drum 5 and flywheel 6 is used to drive a sprocket roller 10 or, in certain cases, a double sprocket. The purpose of driving from the sprocket roller 10 is to enable the sound record carrier 1 to be run in synchronism with a complementary picture record and/or other sound recordings, if desired. The magnetic head M will be a recording head when the sound and the visible indication are simultaneously developed on the carrier, and the magnetic head M will be a reproducing head when the carrier 1 is a completed sound record which is played back to develop signals for actuating the visible record device I. Or, by using a double sprocket such as shown in Fig. 5, to enable the carrier 1 to be run in synchronism with an additional carrier upon which the visible indication record is made.

Figure 3:
Fig. 3 and Fig. 4 are details of the arrangements shown in Fig. 1 and Fig. 2.

Fig. 3 illustrates a detail of Fig. 1 and Fig. 2 and shows the magnetic recording head M and the visible signal indication device I which act upon the carrier 1. The device I may be an inking device or it may be any other suitable device such as a spray gun for lacquering, spraying or otherwise marking an indication record on the carrier 1. The device I may be actuated by the same signal currents as those which actuate the known magnetic recording head M or, as already mentioned, it may be operated by a shift or rectified current or any other control currents from the recording channel; this will, however, be described in greater detail hereinafter with reference to Fig. 6.

Figure 4:
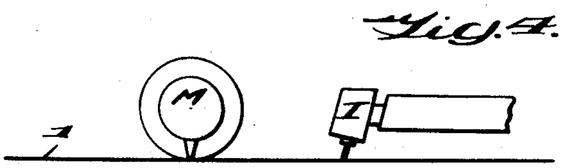

Fig. 4 illustrates the device I as a stylus or cutting head which cuts or engraves a visible signal indication record on the carrier 1. This indication record may be cut in known manner and the stylus I may be actuated by the same currents as those which actuate the device I in Fig. 1 or Fig. 2.

It may be preferable for the cutting head to be disposed on the opposite side of the tape 1 to the magnetic recording head M and, in these circumstances, to employ a tape 1 having a base with two coatings, one coating or layer for the magnetic record and the other coating or layer for the visible indication record cut by the device I. A tape of this kind is described in greater detail hereinafter with reference to Figs. 11 and 12.

Referring now to Fig. 5, this illustrates a modified detail of the arrangement shown in Fig. 2 and shows the tape 1 being driven past the magnetic recording head M by means of a double toothed sprocket 10 which is driven by the motor 9 shown in Fig. 2. The tape 1 passes over the idle roller 4 and is provided with perforation holes 11 which are engaged by one row of teeth 12 in the sprocket 10 and enable it to be run in synchronism with, for example, a separate carrier 13 to which the visible signal indication record is added. The carrier 13 is similarly provided with sprocket holes 14 which are engaged by the other row of teeth 17 on the double toothed sprocket 10. Whereas in the arrangements shown in the preceding figures the visible indication record is added to the same carrier 1 as that which also bears the main sound track recorded by the device M, the arrangement shown in Fig. 5 is one in which the signal indication record is formed on a separate carrier 13. When the signal indication record is made on such a separate carrier 13, both the carriers 1 and 13 should be suitably marked (such as with a line or punched hole), at the beginning to facilitate matching and synchronizing after the recording has taken place. In the specific example shown in Fig. 5 the carrier 13 consists of a chemically treated band or tape which reacts similarly to the known pole paper. The tape 13 is drawn between the two poles of the device I which are fed from a device IA which may be an amplifier fed with the indication signal branched off from the main recording amplifying channel.

The sound recording head M and the signal indicating device I may be mounted close together or they may be spaced apart a certain defined distance, as shown on the drawings. This will enable the editor to cut the sound track exactly opposite the signal indication record when the head M and the device I are mounted together, or at the said predetermined distance apart when the head M and device I are displaced relatively to one another.

Fig. 6 illustrates a block schematic diagram of the main recording channel and the signal indication recording channel. The source of sound to be recorded is shown at S and may be a microphone or sound head or other sources of signals which are fed to an audio frequency or signal amplifier AFA. The signals from the amplifier AFA are fed in known manner to the magnetic recording head M together also in known manner with a high frequency signal derived from the high frequency generator HFG. A portion of the signal fed to the amplifier AFA is branched off and fed to the amplifier IA which feeds the signal indication device I. The signal fed to the device IA may be a portion of the signals being recorded by the device M or it may be a function of the sound waves being recorded. For example, it may be branched off from a part of the main recording channel AFA supplying a shift or rectified current which follows the envelope or average value of the sound waves being recorded.

Referring now to Figs. 7, 8, 9 and 10, these illustrate examples of the different types of visible signal indication records which can be obtained by employing different types of indication device I.

Fig. 7 illustrates the type of signal indication which will be obtained when the device I is an inking or marking device provided with a nib, wick, or similar marking element. The periods of quiescence are illustrated by the straight lines 15 which would be formed when the device I was not being modulated by any signal from the indication amplifier IA, whereas modulation of the device I by a signal such as a word or music played into the microphone S would cause the peaks shown generally at 16. Such a signal indication record when added to and synchronized with an invisible sound track would enable the sound track to be cut or edited without mutilation of the sound record since it would be possible to cut across the part 15 when the recording devices M and I are mounted together, or at the corresponding part on the invisible sound track, when these devices are displaced, and not lose any of the recorded sound indicated by the peaks at 16. A somewhat similar track to that shown by Fig. 7 would also be obtained if the device I was a stylus or similar type of cutting head.

Fig. 8 shows the kind of variable density indication record which would be obtained by the arrangement illustrated in Fig. 5. The carrier 13 would react to the current energizing the pole pieces I and produce an indication similar to that shown at 16. When no signal from the device IA energized the pole pieces I, the carrier 13 would show a blank or unmodulated area 15, as during periods of silence. To facilitate editing and cutting the carrier 13 shown in Fig. 5 and Fig. 8 may be made adhesive and affixed to the magnetic record carrier I when the two records have been made.

Fig. 9 illustrates a type of indication record which would be obtained if the indication amplifier IA supplied the device I with a signal which followed the envelope to the sound waves being recorded. The periods of modulation are again shown at 16 and those of silence at 15.

Fig. 10 shows the type of indication record which would be obtained if the device I was a spray gun type of device which sprayed or spread a liquid or rapidly drying material, for example, a dyed lacquer or powder, through a nozzle or similar orifice on to the carrier I or 13 in accordance with the envelope of the sound waves being recorded. This nozzle could be fitted with a shutter actuated by the currents from the device IA which would close or substantially close the nozzle during periods of silence 15, and so cut off the stream of marking liquid or powder, and open the nozzle mouth during periods of sound 16.

Figure 12:
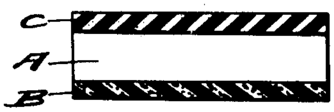
Fig. 12 illustrates an enlarged section through a piece of tape of an improved kind which it is preferred to use.

Figs. 11 and 12 illustrate enlarged sections through pieces of tape of the kind which may be employed in the method according to this invention.

Fig. 11 illustrates, in full lines, a greatly enlarged section through a piece of magnetic tape of the kind as at present in use. The tape consists of two layers, A and B. The layer A comprises the base of the tape, usually composed of cellulose acetate or polyvinyl-chloride having a thickness of about 30-35 mu. The layer B is composed of a ferro-magnetic material and is coated on the layer A by known means. The layer B usually has a thickness of about 20 mu.

It is now proposed, according to the invention, to add an additional layer C to the base layer A, as shown in dotted lines in Fig. 11, and to use the extra layer C not only to space the magnetic layers B further apart when the tape is spooled but also to carry the visible signal indication record. This is particularly advantageous when the said visible signal indication record is cut or engraved by the recording stylus as illustrated in Fig. 4.

It is, however, preferred to use a tape of the kind shown in Fig. 12 having an initially thick base A, for example of the order of 100 to 120 mu, for recording purposes. The tape shown in Fig. 12 comprises three layers, the base A; the magnetizable layer B, which carries the magnetically recorded sound track; and the additional layer C upon which the visible signal indication record corresponding to the signals recorded on the layer B is added. As stated, this indication record may be cut or engraved by a recording stylus although the invention is not restricted to this precise method of adding the visible indication record.

The layer C may be made of wax or gelatine or any other suitable material and it may be added to the base A by brushing, spraying, rolling, calendering, lacquering or the like method and it need only be comparatively thin.

The invention is not restricted to the precise arrangements shown in the accompanying drawings since these are merely given by way of example and many modifications may take place within the scope of the invention. For instance, more than one sound track with its corresponding indication record may be made at the same time in which case several coaxial synchronizing sprockets 10 (Fig. 5) may be used.

We claim:

1. In the recording of sound on an elongated magnetic sound carrier for subsequent editing and synchronization with a complementary and similarly edited picture record, the process which comprises transforming sound waves into electrical impulses, recording said electrical impulses magnetically as an invisible sound signal record on said sound carrier, playing back said sound carrier to derive an electrical current from said invisible sound signal record, and recording said derived electrical current on said sound carrier as a visible signal indication record extending along said sound carrier in synchronism with said invisible sound signal record.

2. In the recording of sound on an elongated magnetic sound carrier, the process as recited in claim 1, wherein said derived electrical current is recorded on said sound carrier as a line.

3. In the recording of sound on an elongated magnetic sound carrier, the process as recited in claim 1, wherein said derived electrical current is recorded on said sound carrier as a colored marking.

4. In the recording of sound on an elongated magnetic sound carrier, the process as recited in claim 1, wherein said derived electrical current is recorded on said sound carrier as a trace cut into the sound carrier.

5. In apparatus for preparing sound carriers of perforated magnetic film type for editing and synchronizing with a complementary and similarly-edited picture record film, the combination of means for supporting and translating a sound carrier bearing an invisible magnetic sound signal record, play-back means including a reproducing head for deriving an electric current from a magnetic sound carrier supported and translated on said first means, an electrically-controlled recording device for producing on the sound carrier a visible signal indication record, and circuit connections between said play-back means and said recording device to energize the same with said derived electrical current, thereby to produce on the sound carrier a visible signal indication record synchronized with the invisible magnetic sound signal record.

6. The invention as recited in claim 5, wherein said reproducer head develops an electric current varying at the audio frequency of the invisible magnetic sound record signal of a sound carrier in transit through said supporting and translating means, and said play-back means includes a rectifier for developing from said audio frequency electric current the said derived electric current which is delivered to said recording device through said circuit connections.

References Cited in the file of this patent

UNITED STATES PATENTS

| Number | Name | Date |
|---|---|---|
| 1,213,150 | Bullis | Jan. 23, 1917 |
| 1,653,467 | O'Neill | Dec. 20, 1927 |
| 1,759,581 | Kwaiten | May 20, 1930 |
| 1,808,046 | Kuchenmeister | June 2, 1931 |
| 1,949,840 | Languepin | Mar. 6, 1934 |
| 2,039,742 | Schinzel | May 5, 1936 |
| 2,279,018 | Wolfe | Apr. 7, 1942 |

FOREIGN PATENTS

| Number | Country | Date |
|---|---|---|
| 177,647 | Switzerland | June 15, 1935 |
| 677,613 | Germany | June 29, 1939 |